A. H. HEYROTH.
WIND WHEEL ELECTRIC GENERATOR.
APPLICATION FILED DEC. 28, 1916. RENEWED FEB. 10, 1920.

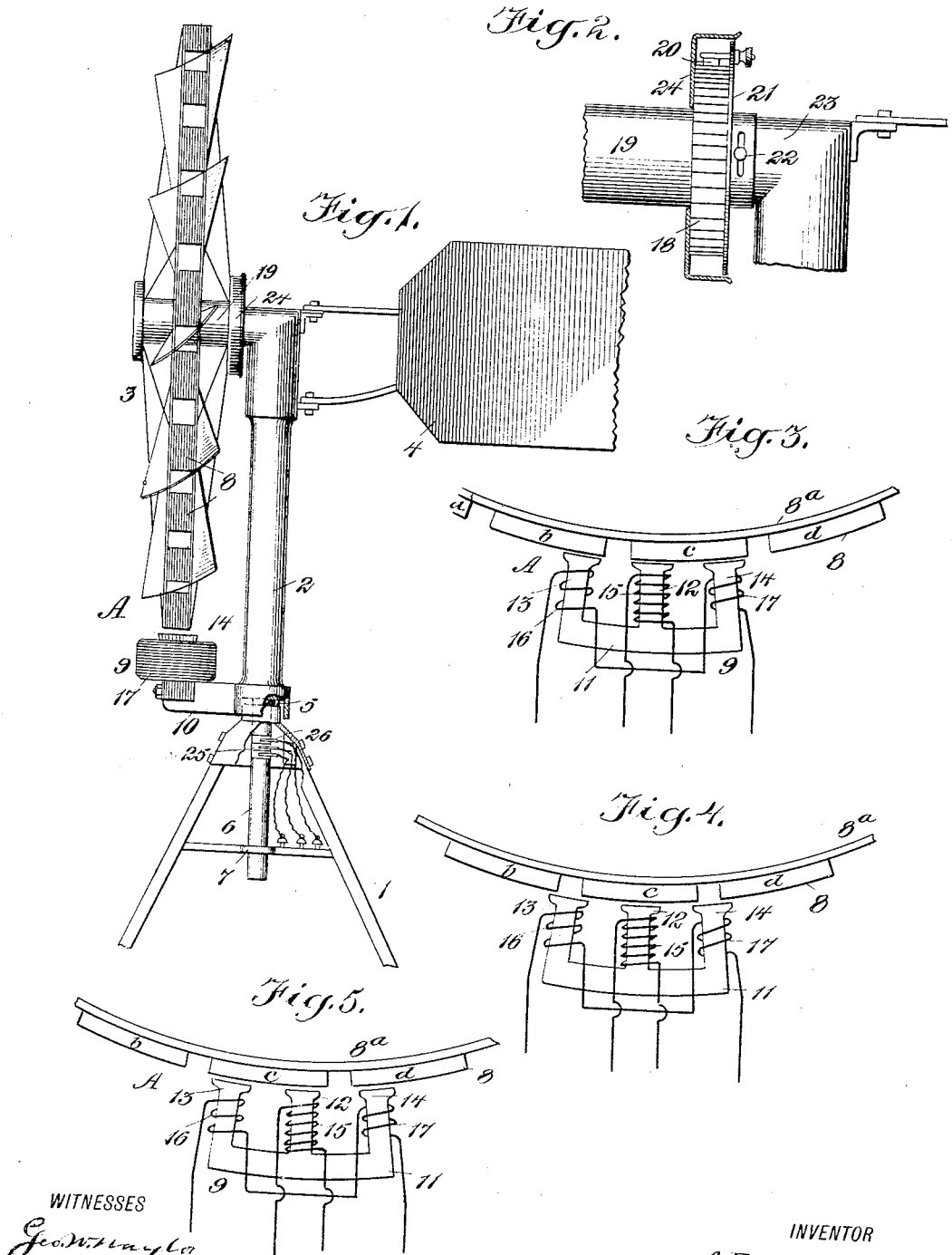

1,352,960.

Patented Sept. 14, 1920.
2 SHEETS—SHEET 2.

WITNESSES

INVENTOR
A. H. Heyroth
BY
ATTORNEYS

UNITED STATES PATENT OFFICE.

ALBERT H. HEYROTH, OF GERALDINE, MONTANA.

WIND-WHEEL ELECTRIC GENERATOR.

1,352,960.  Specification of Letters Patent.  Patented Sept. 14, 1920.

Application filed December 28, 1916, Serial No. 139,248. Renewed February 10, 1920. Serial No. 357,745.

*To all whom it may concern:*

Be it known that I, ALBERT H. HEYROTH, a citizen of the United States, and a resident of Geraldine, in the county of Chouteau and State of Montana, have invented a new and Improved Wind-Wheel Electric Generator, of which the following is a full, clear, and exact description.

This invention relates to electric generators of that type especially adapted for windmills, and the invention relates to improvements in the invention disclosed in my co-pending application for Letters Patent, Serial No. 77171, filed February 9, 1916, now Patent No. 1,233,232, July 10, 1917.

The invention has for its general objects to improve and simplify the construction and operation of generators of the character referred to so as to be more reliable and efficient in use, economical to manufacture, and so designed as to be used in combination with a rectifier, whereby continuous current can be obtained for the charging of storage batteries or other purposes.

A more specific object of the invention is the provision of a generator of that type comprising a series of inductors arranged on the periphery of the wind wheel and movable past a stator of novel construction which contains the inducing and induced windings, the stator comprising a laminated structure having three poles, there being a field or inducing winding on the central pole and generating, induced or armature windings on the lateral poles, whereby the passage of the inductors across the poles will generate alternating current.

With such objects in view, and others which will appear as the description proceeds, the invention comprises various novel features of construction and arrangement of parts which will be set forth with particularity in the following description and claims appended hereto.

In the accompanying drawings, which illustrate certain embodiments of the invention and wherein similar characters of reference indicate corresponding parts in all the views, Figure 1 is a side view of the upper part of a windmill with the electric generator applied thereto;

Fig. 2 is a side view of the rectifying commutator applied to the hub of the wind wheel;

Figs. 3, 4 and 5 are diagrammatic views showing the relative positions of the inductors and poles in producing a half cycle of alternating current;

Figure 6:
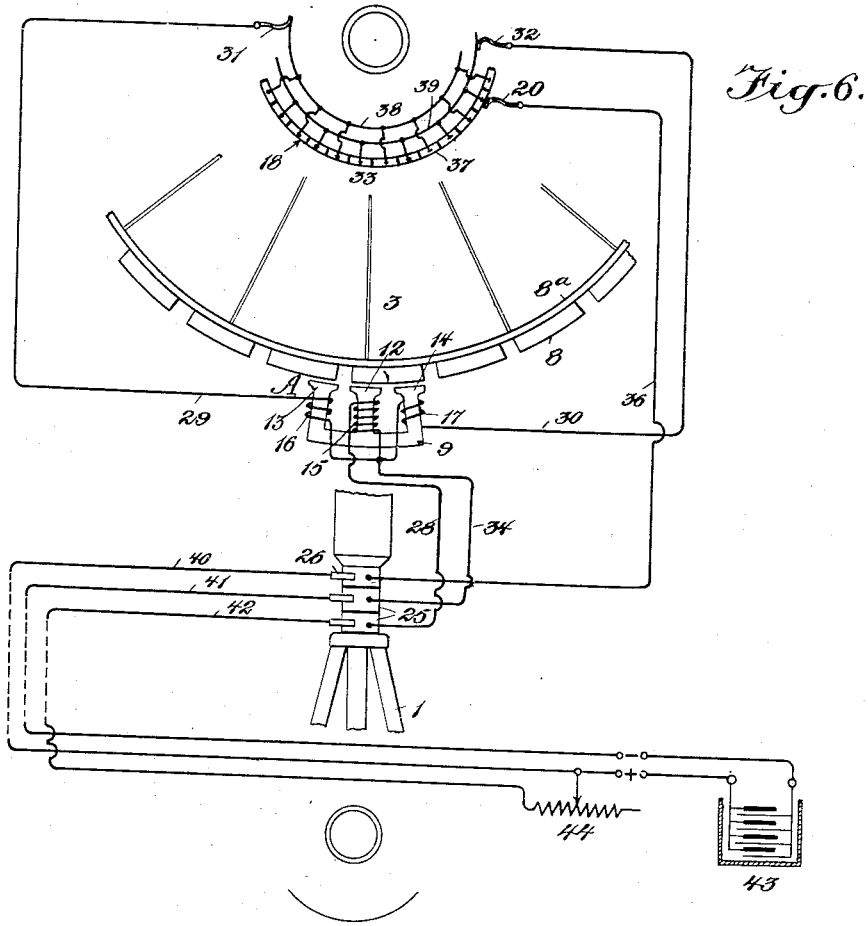
Fig. 6 is a diagrammatic view showing a generator connected with a commutator rectifier and a storage battery.

Referring to the drawing, 1 designates the upper part of a windmill tower which supports the head 2, the head being constructed to carry the wind wheel 3 and the guiding vane or tail 4. The bottom of the head is mounted to turn on a ball-bearing 5 at the top of the tower 1, and the head has a depending stem 6 engaging in a stationary guide bearing 7.

The electric generator A comprises a series of magnetic pieces or inductors 8 spaced around the periphery or rim $8^a$ of the wheel 3 and arranged to travel past the stator 9, which is mounted on a bracket 10 carried by the rotatable head 2. The stator comprises a magnetic frame 11 made up of laminations and formed with a central pole 12 and lateral poles 13 and 14, there being an exciting field or inducing coil 15 on the central pole and generating, induced or armature coils 16 and 17 on the poles 13 and 14, respectively. Each inductor 8 is of such length as to equal the polar faces of two adjacent poles and the intermediate gap between them, and the inductors are spaced apart a distance substantially equal to the gap between adjacent poles of the stator. The field winding 15 may be separately energized or it may be connected with the generating windings 16 and 17 through a rectifier. As the inductors pass the stator or poles a magnetic flux is alternately produced through the poles 12 and 14 and 12 and 13, whereby an alternating current is generated in the windings 16 and 17. The inductor $c$ in moving from the position shown in Fig. 3 to that shown in Fig. 4 produces a change in the magnetic flux, whereby a quarter cycle of electromotive force from zero to maximum is induced in the windings 16 and 17, and as the inductor $c$ passes to the position shown in Fig. 5, another quarter cycle of electromotive force from maximum to zero is produced, resulting in a complete positive or negative impulse, and when the inductor $d$ reaches a position corresponding to that of inductor $c$, Fig. 3, the other half of the cycle of electromotive force will be induced in the windings 16 and 17. Thus, with the passage of one inductor across the stator a complete cycle of electromotive force is induced.

If it is desired to rectify the current mechanically, as by means of a commutator, the commutator is connected with a wheel 3. Preferably such commutator 18 is connected with a hub 19 of the wind wheel and the brush 20 is mounted on a rocker in the form of a disk 21 which is adjustably clamped by a suitable fastener 22 to the axle 23 of the wind wheel. This disk 21 forms part of a housing for the commutator, the other part 24 being fastened to the hub 19 so that the commutator will be protected from the elements. Since the windmill head 2 is adapted to rotate, and since it carries the electric generator it is desirable to provide slip rings 25 on the stem 6 of the head, which rings will be connected with the windings of the stator and with the rectifier, and on the slip rings bear stationary brushes 26 on the tower to connect the generator with an outside circuit.

Fig. 6 shows the complete electric diagram of the generator with the commutator rectifier connected with a storage battery which is to be charged. The three windings each have a terminal connected together at a common point and the other terminal of the field winding 15 is connected by a wire 28 with one of the slip rings 25, and the terminals of the windings 16 and 17 are connected by wires 29 and 30 with the brushes 31 and 32 of the rectifier 33. The point 27 is connected by a common wire 34 with another slip ring 25 and the third brush 20 of the rectifier is connected by a wire 36 with the third slip ring. The rectifier has twice as many commutator segments 37 as there are inductors 8, and the segments are alternately connected into two groups by being connected with conductors or slip rings 38 and 39, on which the brushes 31 and 32 bear, the brush 20 bearing on the commutator segments 37. From the slip ring brushes 26 extend wires 40, 41, 42, the first two of which are connected with a storage battery 43 to be charged, and the wires 41 and 42 are connected together through a rheostat 44 for varying the excitation of the field winding 15.

The advantages of the generator when employing a commutator rectifier are: that only one brush is necessary to contact with the segments of the commutator, and that when the brush 20 short-circuits two adjacent segments, the battery is not short-circuited, since at these points the generator coils 16 and 17 (in parallel) are included in the battery circuit and act as an inductive resistance.

Figure 7:
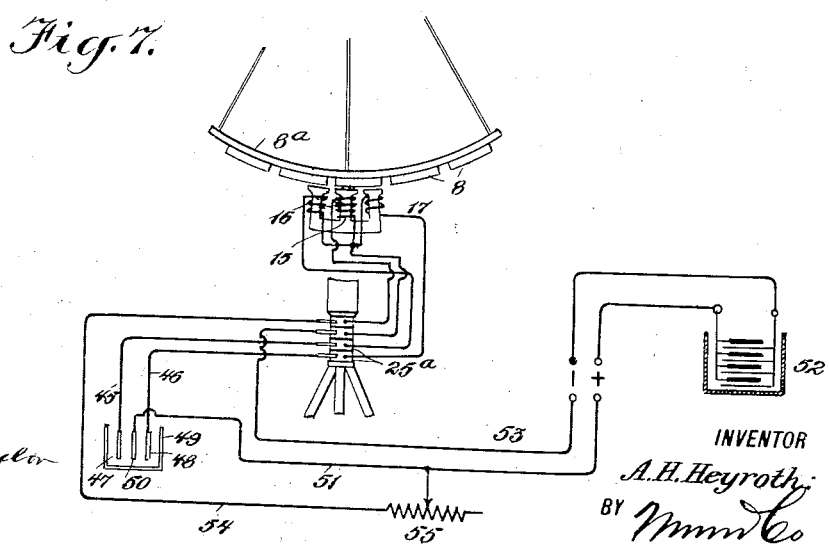
Fig. 7 is a diagrammatic view in which the rectifier is of the electrolytic type.

In Fig. 7 the windings of the stator are connected with four collector rings 25ª, as shown, two of which are connected by wires 45 and 46 with the electrodes 47 and 48 of the electrolytic rectifier 49, the other electrode 50 of the rectifier being connected by a wire 51 with the storage battery 52, the latter being in turn connected by a wire 53 with one of the collector rings. The remaining collector ring is connected by a wire 54 with a rheostat 55 that is connected with the wire 51.

From the foregoing description taken in connection with the accompanying drawings, the advantages of the construction and method of operation will be readily understood by those skilled in the art to which the invention appertains, and while I have described the principle of operation, together with the apparatus which I now consider to be the best embodiment thereof, I desire to have it understood that the apparatus shown is merely illustrative and that such changes may be made when desired as fall within the scope of the appended claims.

Having thus described my invention, I claim as new and desire to secure by Letters Patent:

1. An electric generator comprising stator and rotor elements, said rotor including a plurality of inductors, and the stator including a group of three poles, a field winding on the central pole connected with the windings on the other poles in which alternating current is generated, each inductor being of a length substantially equal to the polar faces of two adjacent poles and the intervening gap, and the inductors being spaced apart a distance substantially equal to the gap between the adjacent poles of the stator, a wind shield on the periphery of which the inductors are mounted, a rotatable head for the wheel, an outside circuit, and a brush and slip ring device connecting the outside circuit with the windings.

2. The combination of a wind wheel, a rotatable head carrying the wheel, a series of inductors on the periphery of the wheel, a stator having a group of poles, an energizing field winding on one pole, windings on the other poles in which alternating current is induced, a commutator rectifier mounted on the wheel, means connecting the alternating current windings with alternate segments, and means engaging the segments to receive continuous current therefrom.

3. The combination of a wind wheel, a rotatable head carrying the wheel, a series of inductors on the periphery of the wheel, a stator located outwardly from the wheel periphery and having a group of poles, an energizing field winding on one pole, windings on the other poles in which alternating current is induced, a commutator rectifier mounted on the wheel, means connecting the alternating current windings with alternate segments, means engaging the segments to receive continuous current therefrom, said commutator having twice as many segments as there are inductors, and alternate segments being connected together, an outside circuit, slip rings connecting the outside circuit with the said windings and with the means receiving continuous current from the rectifier, and a rheostat in the outside circuit for controlling excitation of the field winding.

4. The combination of a wind wheel, a head on which the wheel is mounted, a generator rotor in the form of inductors on the periphery of the wheel, a generator stator mounted on the head at a point outwardly from the periphery of the wheel and including a group of poles having windings, the winding on one pole serving as a generator of magnetic lines of force and the other windings having alternating electro-motive force induced therein, a commutator rectifier carried by the wheel, means for connecting alternate commutator segments into groups, means for connecting the groups of segments with the respective windings in which alternating current is generated, a brush bearing on the commutator segments for receiving continuous current therefrom, and a housing for the commutator including a part carried by the wheel and a part carried by the head.

ALBERT H. HEYROTH.